Patented May 11, 1937

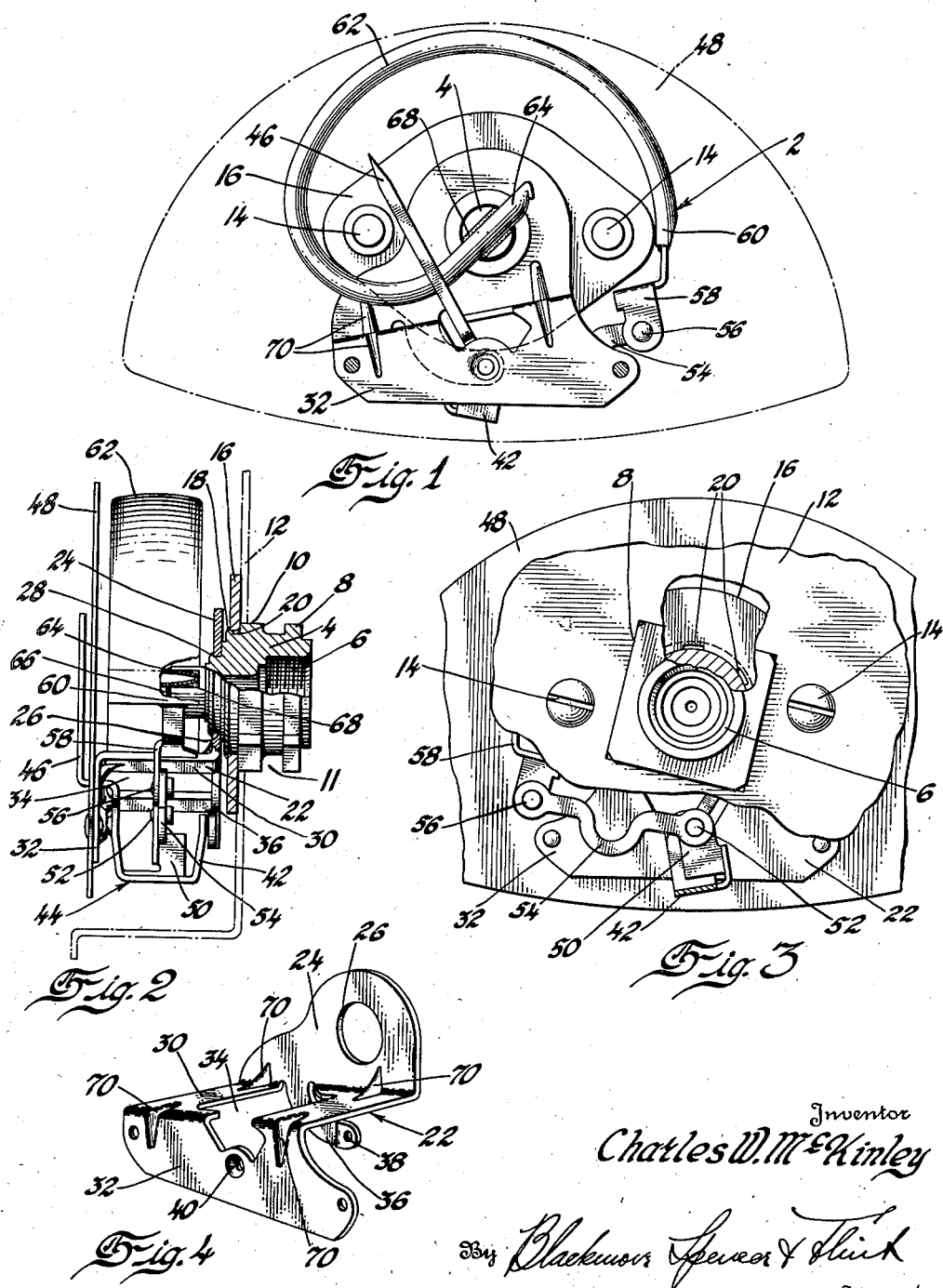

2,079,914

UNITED STATES PATENT OFFICE 2,079,914

BOURDON TUBE GAUGE

Charles W. McKinley, Flint, Mich., assignor to General Motors Corporation, Detroit, Mich., a corporation of Delaware Application May 23, 1936, Serial No. 81,416

1 Claim. (Cl. 73—109)

This invention relates to improvements in Bourdon tube gauges.

In prior art in some types of gauges it has been customary to attach the frame which supports the pointer swinging mechanism to the socket to which the tube is mounted. The casing which encloses the gauge has then been secured to the frame and in securing the casing it has been found that the tightening of the screws which unite the casing to the frame has caused a slight twisting or warping of the frame which will lead to inaccuracies in the reading of the gauge.

The object of the present invention is to remove this difficulty by mounting an extra plate on the socket. This plate is secured on the socket below the part of the frame which is attached to the socket. To this extra plate the casing is secured. In securing the casing to the extra plate the pointer swinging mechanism and the frame on which it is mounted will be subjected to no warping or twisting movement and the gauge may be mounted on the instrument panel of an automotive vehicle, or in a suitable casing, without danger of injuring the frame or mechanism.

Certain improvements are also found in the frame supporting the pointer swinging mechanism.

On the drawing

Figure 1 is a plan view of the gauge with the dial of the casing removed.

Figure 2 is a side view of the structure of Figure 1 with the casing shown in dotted outline and with parts broken away and others shown in section better to illustrate the construction.

Figure 3 is a view from the rear of the casing with parts broken away and others shown in section better to illustrate the construction.

Figure 4 is a perspective view of the frame.

On the drawing the numeral 2 indicates the gauge as a whole. The gauge has the socket 4 interiorly threaded at 6 at one end and having the outer polygonal portion 8. The socket has the second polygonal portion 10 corresponding to the polygonal portion 8 and over which the casing 12 fits as is best shown in Figures 2 and 3. Between the polygonal portions 8 and 10 is a groove 11 the purpose of which is to receive suitable fingers of a testing apparatus when the gauge is applied to the testing apparatus during the testing operation. The polygonal portion 10 of the socket is provided for the purpose of holding the assembly comprising the frame 22, plate 16 and socket 4 against turning when mounted in the casing 12. The casing has a polygonal opening to conform with the polygonal portion 10 of the socket so that when the socket is mounted in the casing the polygonal connection will take all the strain and torque when tightening the fastening means for the gauge piping; thus avoiding strain on the frame or mechanism. This polygonal connection also has the advantage properly to align the instrument so that the dial will be in the correct position. The gauge casing 12 is secured by means of machine screws 14 to a plate 16 secured inside the casing 12 to the socket 4 by riveting or turning over the edge at 18. The plate 16 has the notches 20 around the opening where it fits over the socket. The purpose of the notches 20 is to prevent the rotation of the plate when the edge 18 is once riveted over. When the edge 18 is riveted over a part of the metal will be pressed into the groove.

Over the plate 16 and farther into the casing 12 the frame 22 is secured to the socket 4 by means of the lower frame part 24. The part 24 has the opening 26 which fits over a shoulder on the socket 6 and the edge 28 at the opening is riveted or turned over as shown in Figure 2 rigidly to hold the frame on the socket 6.

Referring to Figure 4 the frame has the part 30 bent at right angles to the part 24 and the part 32 bent at right angles to the part 30 and being in a plane parallel to the plane of the part 24. The part 30 and a section of part 32 are cut out at their centers as shown at 34 and an arm or tongue 36 is formed from the cutout portion and bent into the plane of the part 24. The end of the arm 36 has an opening 38 while the part 32 has an opening 40 in which there are mounted the studs or pins of the frame 42 (Figure 2) of the pointer swinging mechanism indicated as a whole at 44. The frame 42 has formed integral therewith the pointer 46 which projects through the cutout section of part 32 and is adapted to move over the dial 48. Also formed integral with the frame 42 is the finger 50 to which there is pivoted at 52 a link 54 the other end of which is pivoted at 56 to an arm 58 secured to the free end 60 of a Bourdon tube 62. The other end 64 of the Bourdon tube is mounted in the stub end 66 of the socket 4 and secured in place by the solder 68.

The frame 22 is provided with the strengthening ribs or indentations 70 at the lines of junction between the parts 24, 30, and 32, the purpose of these indentations being to strengthen the frame and give it rigidity.

By referring to Figure 2 it will be noted that the casing 12 is attached directly to the plate 16 which is independent of and spaced from the part 24 of the frame 22. In applying the casing and tightening the securing screws 14 any stress or strain will be transmitted directly to the plate 16 and leave the frame 22 and the pointer swinging mechanism 44 free of any distortion which would be communicated to the frame were the casing 12 secured directly to the part 24 as in the prior art.

I claim:

In a Bourdon tube gauge having a pointer swinging mechanism adapted to move a pointer over a dial, a socket having stepped annular shoulders closely positioned one above the other, an extension on said socket projecting beyond said shoulders, a Bourdon tube mounted in said extension, a frame having its base secured to one of the shoulders on the socket, said pointer swinging mechanism mounted on said frame, a plate secured to the other of said shoulders immediately adjacent and below said frame, said plate being independent of said frame and being adapted to have the casing of the gauge attached thereto, said shoulders and base and plate being positioned between the Bourdon tube and the bottom of the casing.

CHARLES W. McKINLEY.